US007277074B2

(12) United States Patent
Shih

(10) Patent No.: US 7,277,074 B2
(45) Date of Patent: Oct. 2, 2007

(54) CONTROL CIRCUIT FOR A COMMON LINE

(75) Inventor: Po-Sheng Shih, Hsinchu (TW)

(73) Assignee: Hannstar Display Corporation (TW)

( * ) Notice: Subject to any disclaimer, the term of this patent is extended or adjusted under 35 U.S.C. 154(b) by 713 days.

(21) Appl. No.: 10/835,468

(22) Filed: Apr. 30, 2004

(65) Prior Publication Data

US 2004/0227746 A1 Nov. 18, 2004

(30) Foreign Application Priority Data

May 1, 2003 (TW) .............................. 92112052 A

(51) Int. Cl.
*G09G 3/36* (2006.01)
*G09G 5/00* (2006.01)
*G06F 3/038* (2006.01)

(52) U.S. Cl. .......................... 345/87; 345/90; 345/204; 345/211

(58) Field of Classification Search .................. 345/87, 345/90, 92, 204, 211, 212
See application file for complete search history.

(56) References Cited

U.S. PATENT DOCUMENTS 5,831,709 A * 11/1998 Song .......................... 349/149
6,509,894 B1 * 1/2003 Maekawa et al. ........... 345/211
6,778,158 B2 * 8/2004 Sun ............................. 345/87
7,012,587 B2 * 3/2006 Satoh et al. .................. 345/82
2003/0043127 A1 * 3/2003 Satoh et al. ................ 345/204
2003/0214470 A1 * 11/2003 Wein-Town .................. 345/87

FOREIGN PATENT DOCUMENTS

FR 2 722 603 A1 1/1996
TW 274607 A4 4/1996

* cited by examiner

*Primary Examiner*—Richard Hjerpe
*Assistant Examiner*—My-Chau T. Tran
(74) *Attorney, Agent, or Firm*—Sughrue Mion, PLLC

(57) ABSTRACT

A control circuit for a common line is provided. The control circuit is connected to each of common lines of a liquid crystal display. The control circuit modulates the voltage of each individual common line. The control circuit controls the switching time of the common line according to a pass pulse, and switches the voltage of the common line according to two switching signals. The two switching signals have opposite logic levels in the same frame time.

26 Claims, 10 Drawing Sheets

CONTROL CIRCUIT FOR A COMMON LINE

BACKGROUND OF THE INVENTION

1. Field of Invention

The invention relates to a liquid crystal device (LCD) and, in particular, to a control circuit for a common line.

2. Related Art

Liquid crystal devices (LCD's) have the advantages of high image quality, small size, light weight, low driving voltage, low power consumption, and wide applications. Therefore, they are often used in mid- and small-size portable televisions, mobile phones, video cameras, laptop computers, desktop displays, and projective televisions. Gradually, they replace the cathode ray tube (CRT) monitors and become the mainstream of display devices. Because of its high display quality and low power consumption, the thin film transistor (TFT) LCD has occupied the majority of the market.

The primary components of an LCD are liquid crystal pixels disposed in an array sandwiched and enclosed between two substrates. One of the substrates provides a pixel electrode, and the other provides a common electrode. The TFT LCD uses a single TFT to impose a voltage on the corresponding pixel electrode. The crystal axis direction is then determined by the potential difference between the pixel electrode and the common electrode, thereby controlling whether the local crystal is transparent or opaque.

Generally speaking, the TFT's for the crystal liquid pixels in the same row are controlled by one scan line. The potential of the associated common electrode is controlled by a common line. With reference to FIG. 1A, the scan lines 102 ($G_n$~$G_{n+3}$) are used to control the TFT's of liquid crystal pixels in different rows. However, their common lines 104 are connected together. That is, liquid crystal pixels of different rows have the same common electrode potential. When the common electrode potential of one of the rows is changed, those of other rows will change accordingly.

With the advance in the technology of LCD's, there are some new methods, such as common modulating or other special techniques, for improving the operation of liquid crystal pixels. From FIG. 1B, we see that the conventional method only uses the potential 112*a* on the pixel electrode to change the voltage imposed on the liquid crystal pixels, while the potential 114*a* on the common electrode is maintained at a constant. Therefore, if one wants the potential difference a imposed on a liquid crystal pixel of two adjacent frame times to be equal, the change in the potential 112*a* has to be two times a.

With reference to FIG. 1C, the common modulating method simultaneously uses both the potential 112*b* on the pixel electrode and the potential 114*b* on the common electrode to change the voltage imposed on the liquid crystal pixels. Since the common electrode potential 114*b* is also employed to change the voltage on a pixel, the change in the pixel electrode potential 112*b* only needs to be half that of the conventional method in order for the potential difference a imposed on the liquid crystal in two frame times to be the same.

From the above description, we see that if one uses the common modulating method to operate the liquid crystal pixels, the potential on the common line has to be changed periodically with the frame time. The potential of the common line in other special applications often needs to be changed too. Owing to the existing driving means in LCD's, the common lines of different rows have to be connected together (as shown in FIG. 1A). Therefore, if the common electrode potential of a particular row is to be varied, the common electrode potential on the whole panel has to be changed accordingly at the same time. If the common electrode potential has to be changed frequently because they are connected together, there are the following drawbacks:

1. High switch frequencies will result in large power consumption;
2. High impedance of the common electrode may easily produce horizontal cross-talk; and
3. Asynchronous switching between the scan line and the common line will generate perturbations on the potential difference of the liquid crystal pixels, seriously affecting the LCD image quality.

SUMMARY OF THE INVENTION

An objective of the invention is to provide a control circuit for a common line to solve the switching problem in conventional common lines.

Another objective of the invention is to provide a liquid crystal display (LCD), the potentials of whose common lines can be individually switched.

A further objective of the invention is to provide a control method for common lines where two switching signals are combined to control a control circuit in order to control the potential of the common line.

To achieve the above objective, the invention provides a control circuit for a common line. A control circuit is provided for each common line in different rows. The control circuit is connected to each of common lines of a liquid crystal display. The control circuit modulates the voltage of each individual common line. The control circuit controls the switching time of the common line according to a pass pulse, and switches the voltage of the common line according to two switching signals. The two switching signals have opposite logic levels in the same frame time.

According to a preferred embodiment of the invention, the disclosed control circuit is connected to a scan line, using which to provide pass pulses. The scan line connected to the control circuit is selected from the scan line of the same row which the common line belongs or, according to needs, the scan lines of the preceding few rows or the succeeding few rows. The goal is to achieve the time difference required for changing the potentials on the pixel electrode and the common electrode of a liquid crystal.

Moreover, the common lines of the preceding few rows can provide the two switching signals. And by connecting the common lines of the preceding few rows in cascade for providing the switching signals, the RC delay problem as a result of long switching signal line can be avoided. Therefore, the invention can provide a larger input voltage range.

To solve the RC delay problem during the switching of the common line, the invention further uses the double gate pulse method to control the scan lines and common lines of the liquid crystal pixels. A switching voltage write pulse is used to make the control circuit write in a predetermined common level on the common line. After the terminal end of the common line also achieves this predetermined common level, another pixel voltage write pulse is used to write pixel data in the liquid crystal pixel.

Using the disclosed control circuit, common lines of different rows in the LCD do not need to be connected together. Their voltages can be independently controlled. Therefore, the common line potential in each row only needs to switch once in each frame time. This does not only prevent the power consumption problem caused by highfrequency switching, but also solves the horizontal cross-talk problem due to the high impedance of the connected common lines.

Using the disclosed double gate pulse operation method, it can be ensured that the common line potential has been switched when the liquid crystal pixel is written with pixel data. Therefore, the disclosed method can solve the potential perturbation problem because the switching between the double scan line and the common line is asynchronous.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

To improve the switching problem on the common line of the liquid crystal device (LCD), the invention provides a control circuit for a common line.

The invention provides a control circuit for each common line in different rows. The control circuit modulates the voltage of a single common line. The control circuit controls the switching time of the common line according to a pass pulse, and switches the voltage of the common line according to two switching signals. The two switching signals have opposite logic levels in the same frame time.

The above-mentioned control circuit can be connected to a scan line, using which to provide the pass pulses. The scan line connected to the control circuit is selected from the scan line of the same row which the common line belongs or, according to needs, the scan lines of the preceding few rows or the succeeding few rows. The goal is to achieve the time difference required for changing the potentials on the pixel electrode and the common electrode of a liquid crystal.

Moreover, the common lines of the preceding few rows provide the two switching signals. And by connecting the common lines of the preceding few rows in cascade for providing the switching signals, the RC delay problem as a result of long switching signal line can be avoided. Therefore, the invention can provide a larger input voltage range.

To solve the RC delay problem during the switching of the common line, the invention further uses the double gate pulse method to control the scan lines and common lines of the liquid crystal pixels. A switching voltage write pulse is used to make the control circuit write in a predetermined common level on the common line. After the terminal end of the common line also achieves this predetermined common level, another pixel voltage write pulse is used to write pixel data in the liquid crystal pixel.

Embodiment 1

Figure 1A:
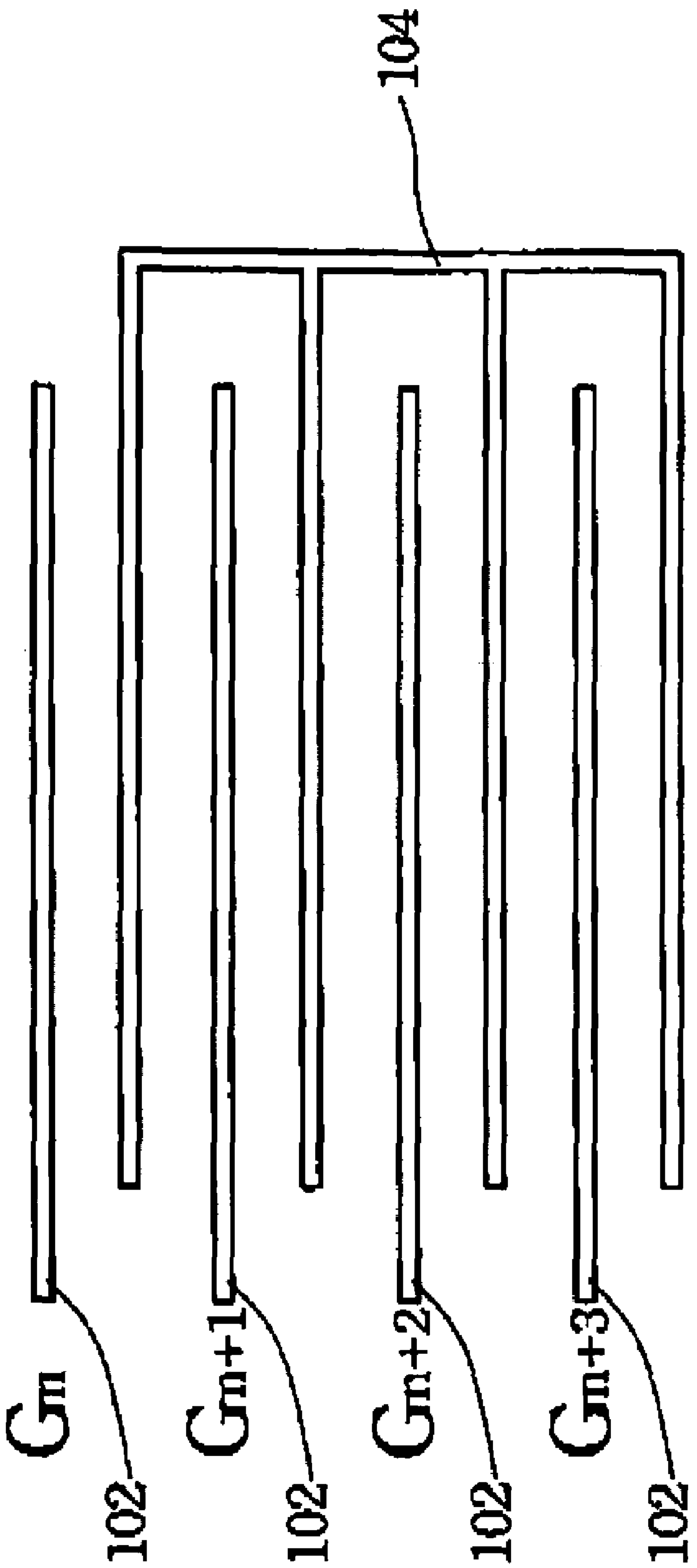
Fig. 1A (PRIOR ART)
FIG. 1A is a schematic view of the conventional scan line and common line.
Figure 1B:
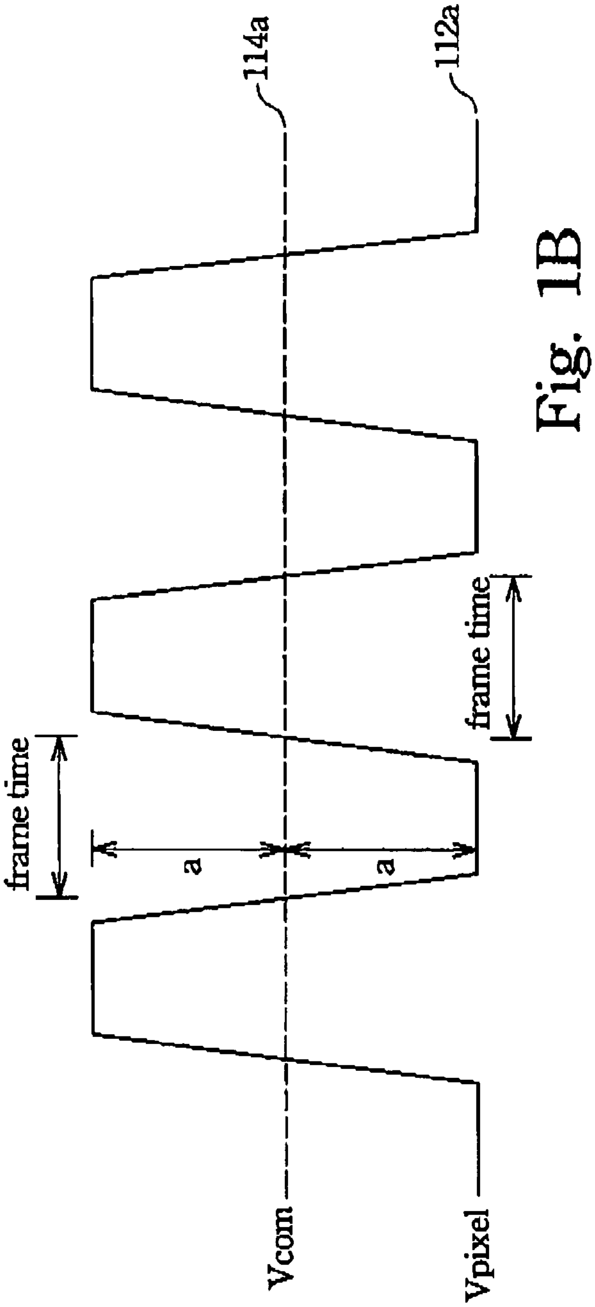
Fig. 1B (PRIOR ART)
FIG. 1B is a schematic view of how the potentials on the pixel electrode and the common line vary.
Figure 1C:
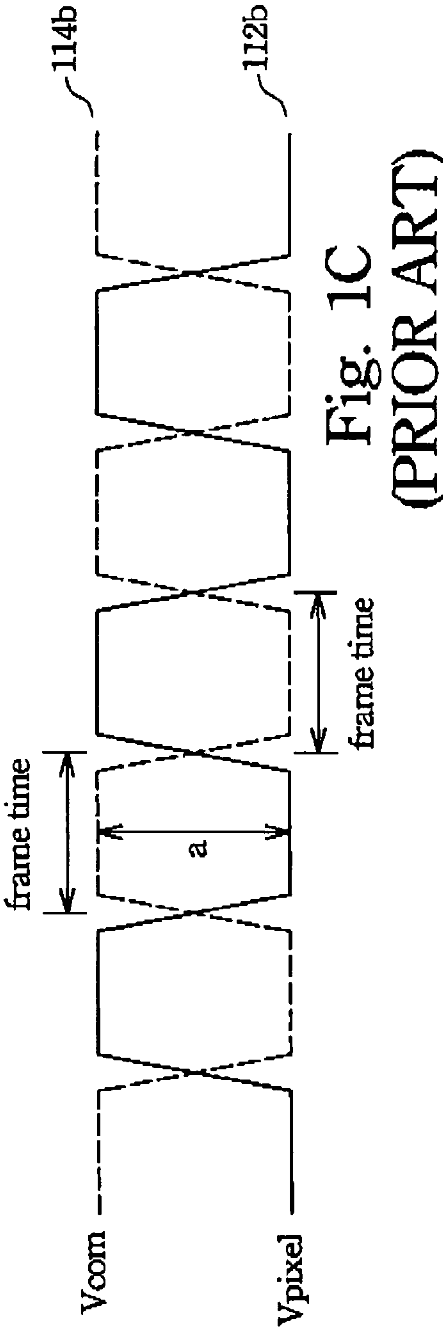
Fig. 1C (PRIOR ART)
FIG. 1C is a schematic view of the common modulating of the pixel electrode and the common line.
Figure 2A:
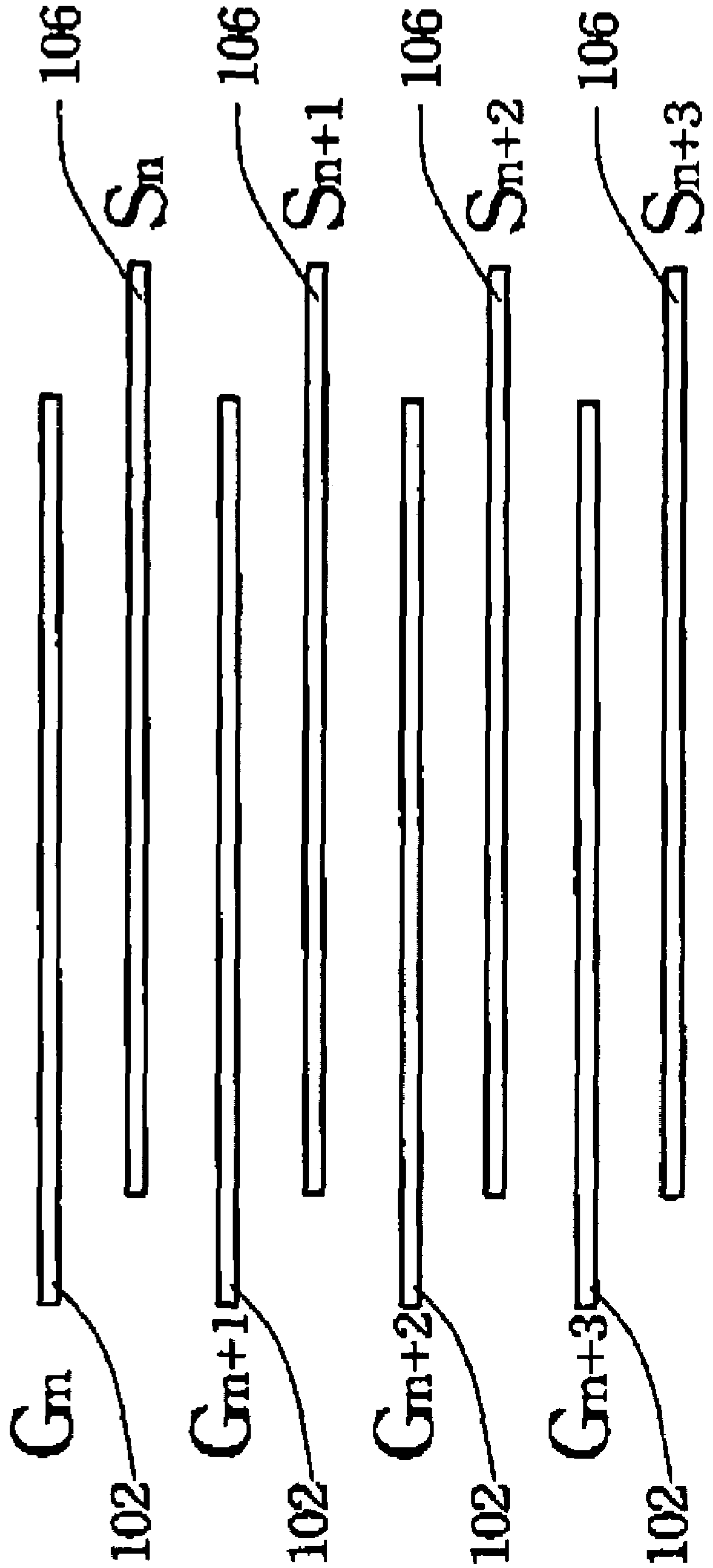
FIG. 2A is a schematic view of the disclosed scan line and common line.

As shown in FIG. 2A, the scan lines 102 ($G_n$~$G_{n+3}$) are used to independently control the thin film transistors (TFT's) of liquid crystal pixels in different rows. Moreover, the common lines 106 ($S_n$~$S_{n+3}$) of the liquid crystal pixels in different rows are also independent; none of them is connected together. That is, the invention can independently change the potentials of the common electrodes for the liquid crystal pixels in different rows. When the common electrode potential of the liquid crystal pixels in a row is changed, those of other liquid crystal pixels do not vary at all.

Figure 7:
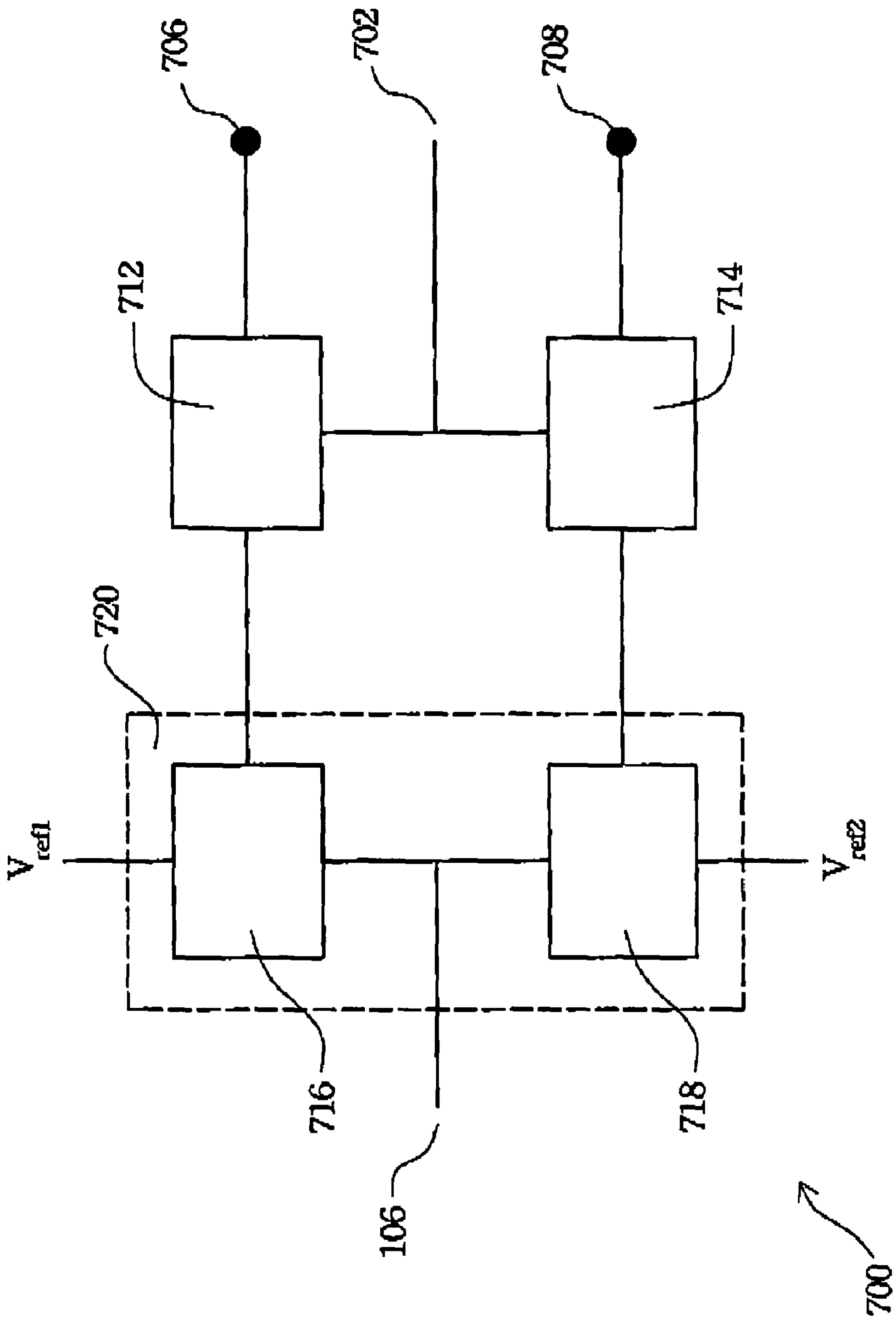
FIG. 7 is a schematic view of the control circuit according to a preferred embodiment of the invention.

FIG. 7 is a schematic view of the control circuit according to a preferred embodiment of the invention. The control circuit 700 in FIG. 7 is used to control the common line 106 in FIG. 2A. A first input element 712 is arranged to receive a first switching signal at a terminal 706, and a second input element 714 is arranged to receive a second switching signal at a terminal 708. The invention uses the relation of the logic levels of the two switching signals to control the voltage of the common line 106.

An output element 720 is arranged to receive a switching signal, such as the first and second switching signals from the first and second elements 712 and 714, and to change the voltage of the common line according to the first and second switching signals. A controlling input 702 is connected to the first and second input elements 712 and 714 for for controlling the first and second input elements 712 and 714 to send the first and second switching signals to the output element 720, respectively.

In this preferred embodiment, the controlling line 702 is connected to a scan line, and a pass pulse of the scan line is used to control the sending of the first and second switching signals to the output element 720. The scan line and the common line can belong to whether the same or two different rows of a liquid crystal display. The output element 720 has first and second reference elements 716 and 718.

The first reference element 716 connected to a first voltage ($V_{ref1}$), and are arranged to receive the first switching voltage from the first input element 712. The second reference element 718 connected to a second voltage ($V_{ref2}$), and are arranged to receive the second switching voltage from the second input element 714. Moreover, The first switching signal and the second switching signal have opposite logic levels, and are with the same frame time.

Figure 2B:
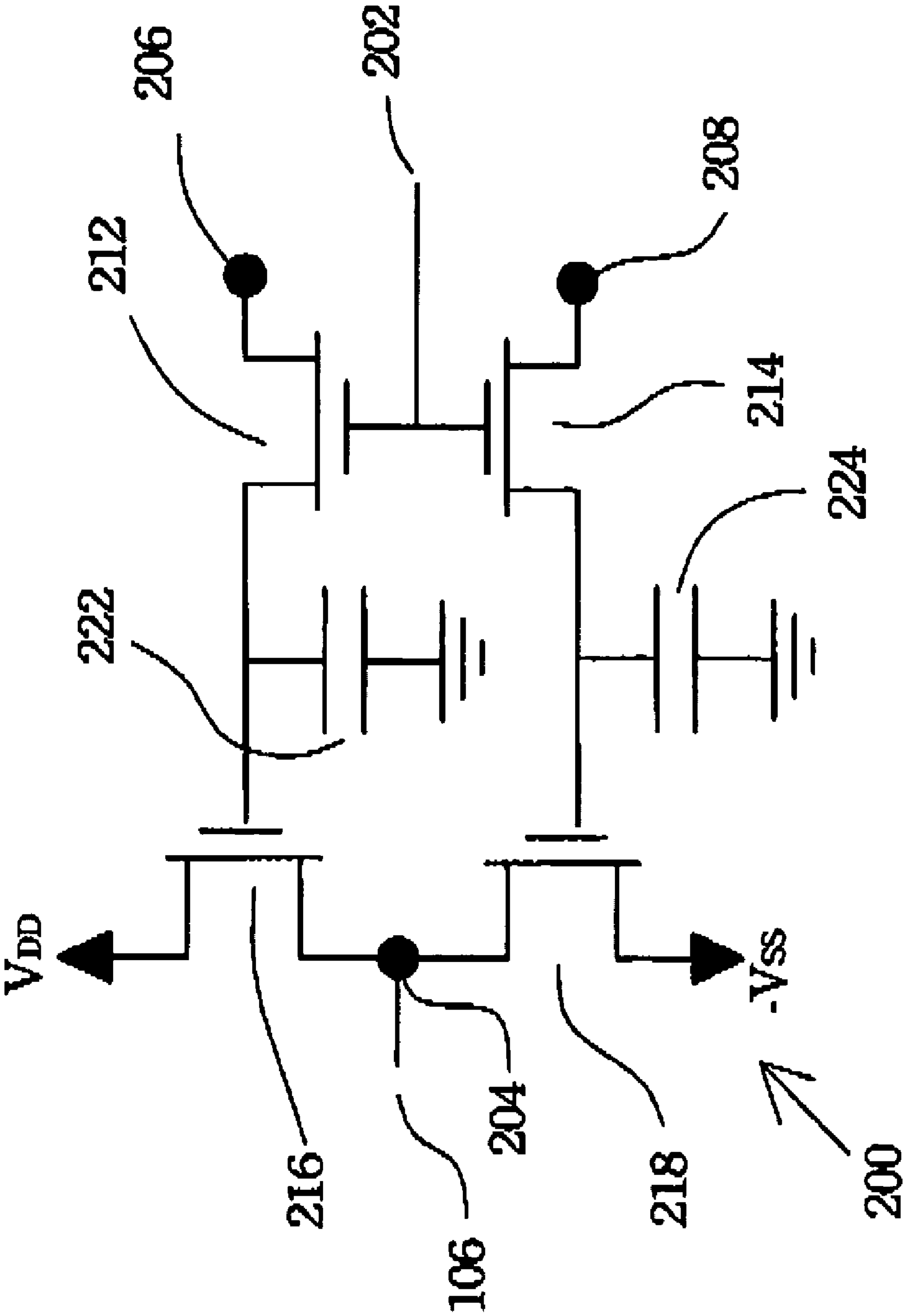
FIG. 2B is a circuit diagram of the control circuit of the common line according to a preferred embodiment of the invention.

FIG. 2B is a circuit diagram of the control circuit of the common line according to a preferred embodiment of the invention. It should be mentioned that the control circuit in FIG. 2B only controls a single common line. It is an obvious extension of the invention to drive the common lines of all liquid crystal pixels. The driving method and principle are described as follows.

The control circuit 200 in FIG. 2B is used to control one of the common lines 106 in FIG. 2A. The control circuit 200 is connected to a control line 202, such as a gate signal line which is used to control the ON and OFF of the transistors 212, 214. Generally, the control line 202 is connected to a scan line, and a pass pulse of the scan line is used to control the switches of the transistors 212 and 214. The two drains 206, 208 of the transistors 212, 214 receive the two switching signals, respectively. The invention uses the relation of the logic levels of the two switching signals to control the voltage of the common line 106.

A capacitor 222 is connected to the source of the transistor 212. When the transistor 212 is conductive, the capacitor 222 stores the switching signal from the drain of the transistor 212. Likewise, a capacitor 224 is connected to the source of the transistor 214. When the transistor 214 is conductive, the capacitor 224 stores the switching signal from the drain of the transistor 214. The capacitors 222, 224 are connected to the gates of the transistors 216, 218, respectively. The switches of the transistors 216, 218 are controlled by the stored switching signals of the capacitor 222,224 in order to change the voltage on the common line 106.

The drain of the transistor 216 is connected to a voltage $V_{DD}$. The source of the transistor 218 is connected to another voltage $-V_{SS}$. The voltage $V_{DD}$ is high than $-V_{SS}$. Moreover, the source of the transistor 216 and the drain of the transistor 218 are connected to the node 204 that is in connection with the common line 106. Therefore, the disclosed control circuit can change the voltage at the node 204 using the combination of the transistors 216, 218.

When the transistor 216 is conductive while the transistor 218 is off, the voltage at the node 204 is set to $V_{DD}$. On the other hand, when the transistor 216 is off while the transistor 218 is conductive, the voltage at the node 204 is set to $-V_{SS}$. Generally speaking, $V_{DD}$ is positive and $-V_{SS}$ is negative. However, in some special applications, the signs of $V_{DD}$ and $-V_{SS}$ are not fixed as in the current embodiment.

Figure 3A:
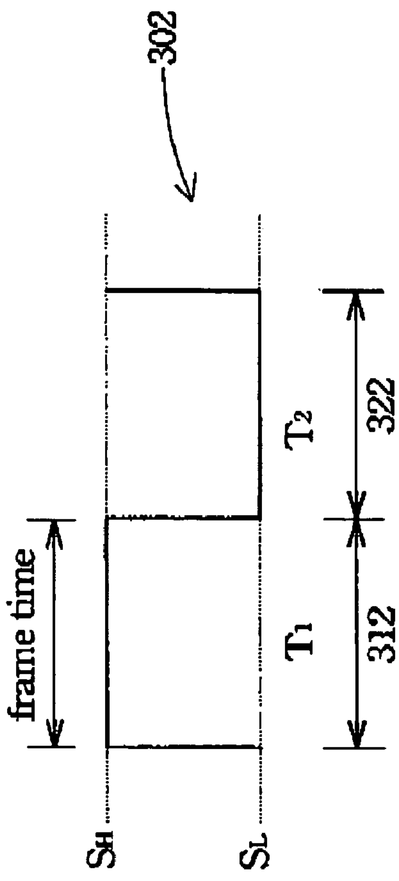
FIG. 3A is a schematic view of the first switching signal in a preferred embodiment of the invention.
Figure 3B:
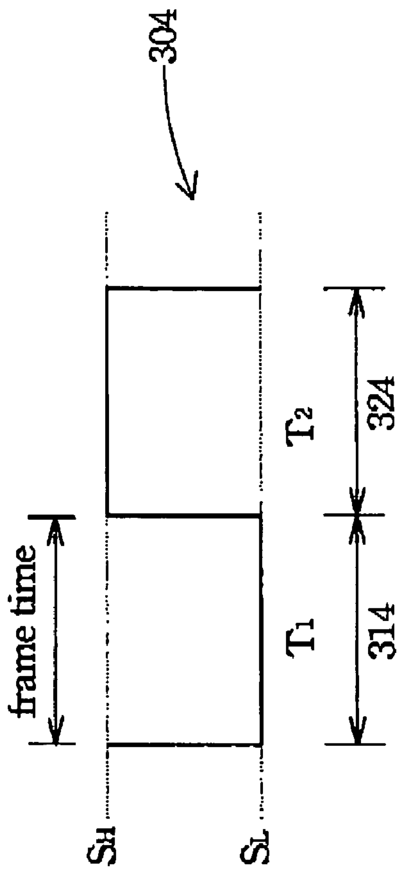
FIG. 3B is a schematic view of the second switching signal in a preferred embodiment of the invention.

When the control circuit in FIG. 2A is operating, a first switching signal 302 composed of two fields 312, 322 enters the drain 206 of the transistor 212 and a second switching signal 304 composed of two fields 314, 324 enters the drain 208 of the transistor 214, as shown in FIGS. 3A and 3B. The fields 312, 322, 314, 324 have the same frame time. The frame time is defined as the time interval between the starting times of two adjacent pass pulses on the same scan line.

In the invention, the first switching signal 302 and the second switching signal 304 have to have opposite logic levels. That is, in the frame time $T_1$, the field 312 in the first signal 302 has a high logic level $S_H$. At the same time, the field 314 in the second switching signal 304 has a low logic level $S_L$. In the frame time $T_2$, the field 322 in the first signal 302 has a low logic level $S_L$, while the field 324 in the second switching signal 304 has a high logic level $S_H$.

Please refer to FIGS. 2B, 3A, and 3B for the following description about the disclosed control circuit. In the frame time $T_1$, the field 312 of the first switching signal 302 has a high logic level $S_H$ and the field 314 of the second switching signal 304 has to have a low logic level $S_L$. At this moment, the gate signal line 202 sends a pass pulse so that the transistors 212, 214 become conductive. Therefore, the high level $S_H$ and the low level $S_L$ respectively pass through the transistors 212, 214 and are stored in the capacitors 222, 224.

Afterwards, the high level $S_H$ stored in the capacitor 222 makes the transistor 216 conductive while the low level $S_L$ stored in the capacitor 224 shuts down the transistor 218, so that the voltage at the node 204 becomes $V_{DD}$. After the above operation, the voltage of the common line 106 in communications with the node 204 in the frame time $T_1$ is maintained at $V_{DD}$.

In the frame time $T_2$, the field 322 of the first switching signal 302 has a low logic level $S_L$, while the field 324 of the second switching signal 304 has to have a high logic level $S_H$. At this moment, the gate signal line 202 sends a pass pulse so that the transistors 212, 214 become conductive. Therefore, the low level $S_L$ and the high level $S_H$ respectively pass through the transistors 212, 214 and are stored in the capacitors 222, 224.

Afterwards, the low level $S_L$ stored in the capacitor 222 shuts down the transistor 216 while the high level $S_H$ stored in the capacitor 224 makes the transistor 218 conductive, so that the voltage at the node 204 varies from $V_{DD}$ to $-V_{SS}$. Therefore, the invention uses the combination of the first switching signal 302 and the second switching signal 304 in the frame times $T_{1\ and\ T2}$ to control the disclosed circuit 200 to change the voltage on the common line 106.

Moreover, transistors usually have some stray capacitors. Therefore, if the stray capacitors on the transistors 216, 218 are larger enough to store the first switching signal and the second switching signal passing through the transistors 212, 214, then there is no need to provide the additional capacitors 222, 224. The disclosed control circuit 200 is greatly simplified then.

Embodiment 2

Figure 4:
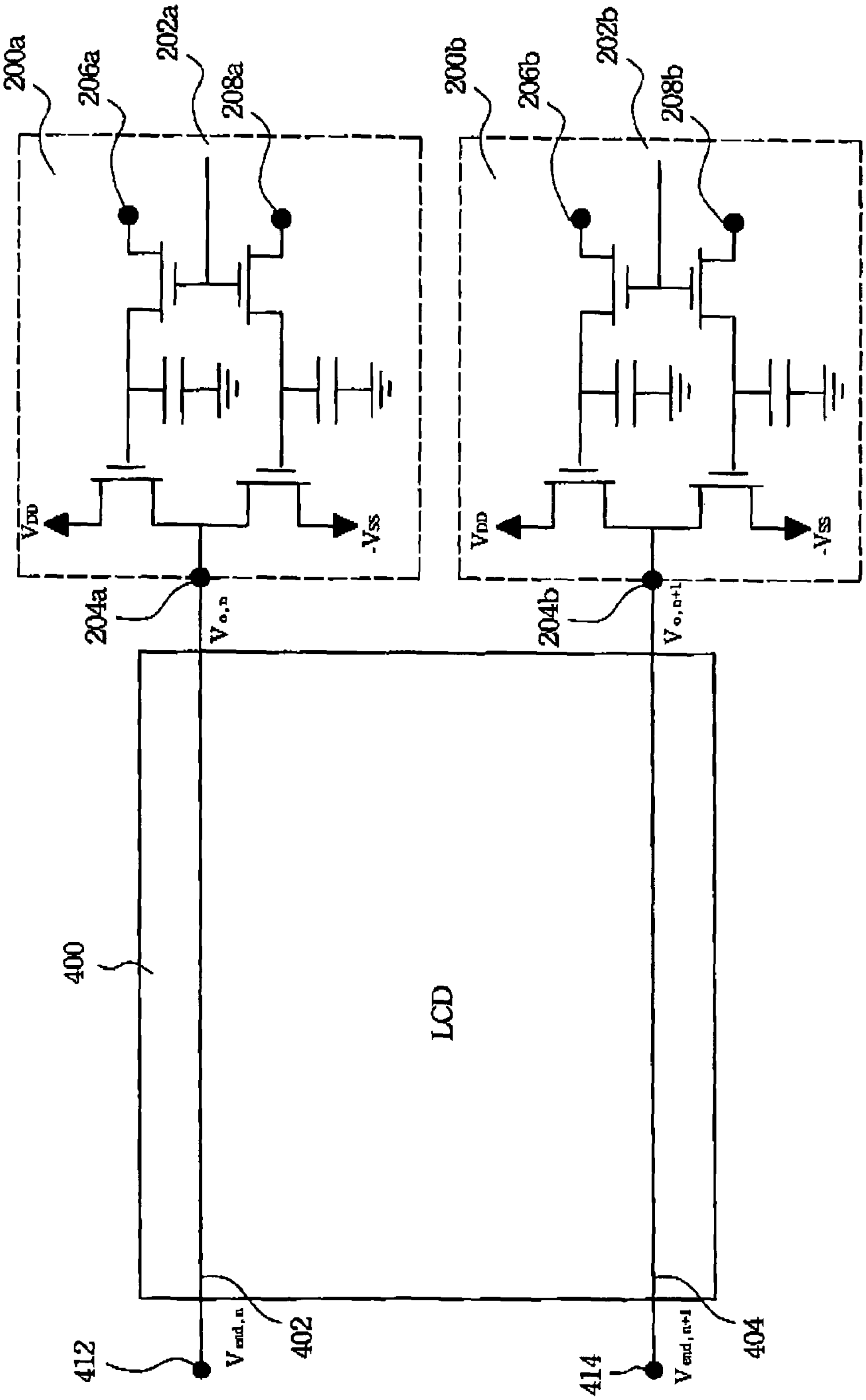
FIG. 4 is a schematic view of the LCD using the control circuit in FIG. 2B to control the common line.

In FIG. 4, we show an LCD using the above-mentioned control circuit to control the common lines. Here we only draw two adjacent common lines to explain the configuration of the disclosed control circuit and the operation method. In general, the LCD 400 has several common lines (only two adjacent ones 402, 404 being shown in the drawing). The common lines 402, 404 are connected to the control circuits 200*a*, 200*b* at the nodes 204*a*, 204*b*, respectively. The control circuits 200*a*, 200*b* are the same as that in FIG. 2B. Therefore, we can use the control circuits 200*a*, 200*b* to control the voltages on the common lines 402, 404 in the LCD 400, respectively.

In the following, we use FIGS. 3A and 3B to discuss how to change the voltages on the two adjacent common lines using the invention. In existing LCD's, to render a perfect image display, the voltages on the liquid crystal pixels in different rows can be "+−+−", "++−−", or other combinations. Thus, the voltages on two adjacent common lines should have same-sign (++,−−) and opposite-sign (+−,−+) operation methods.

As shown in FIG. 4, when the voltages on two adjacent common lines have the same sign, the terminal 206*a* of the control circuit 200*a* and the terminal 206*b* of the control circuit 200*b* have to have the same logic level. The terminal 208*a* of the control circuit 200*a* and the terminal 208*b* of the control circuit 200*b* have to have the same logic level, too.

In other words, the terminals 206*a*, 206*b* receive the first switching signal 302 of FIG. 3A while the terminals 208*a*, 208*b* receive the second switching signal 304 of FIG. 3B at the same time. On the other hand, the second switching signal 304 of FIG. 3B simultaneously enters the terminals

206*a*, 206*b*, and the first switching signal 302 simultaneously enters the terminals 208*a*, 208*b*. Thus, the voltages on two adjacent common lines 402, 404 have the same sign, showing the ++ or −− voltage pattern.

However, when the voltages on two adjacent voltages have opposite signs, the terminal 206*a* of the control circuit 200*a* and the terminal 208*b* of the control circuit 200*b* have to have the same logic level. Simultaneously, the terminal 208*a* of the control circuit 200*a* and the terminal 206*b* of the control circuit 200*b* have to have the same logic level, too.

In other words, the terminals 206*a*, 208*b* receive the first switching signal 302 of FIG. 3A while the terminals 208*a*, 206*b* receive the second switching signal 304 of FIG. 3B at the same time. On the other hand, the second switching signal 304 of FIG. 3B simultaneously enters the terminals 206*a*, 208*b*, and the first switching signal 302 simultaneously enters the terminals 208*a*, 206*b*. Thus, the voltages on two adjacent common lines 402, 404 have the opposite signs, showing the +− or −+ voltage pattern.

Embodiment 3

We have described how to control the voltages on two adjacent common lines in the previous embodiment. According to another embodiment of the invention, the voltages on the terminals 206a, 208*a*, 206*b*, 208*b* are provided by the common lines in the preceding few rows. From the embodiments shown in FIGS. 3A, 3B, and 2B, we know that when the voltage at the terminal 206 is high $S_H$, the voltage at the node 204 (connecting to the common line) is $V_{DD}$. When the voltage at the terminal 206 is low $S_L$, the voltage at the node 204 is $-V_{SS}$.

From the above description, we see that the common lines in the LCD have high or low (positive or negative) voltages that vary as the switching signals changes with frame time. Therefore, the first switching signal and the second switching signal required by the disclosed control circuit may be provided by the common lines of the preceding few rows connected in cascade. The common lines of which preceding rows selected to be cascaded are determined by the voltage needed in practice.

This operation method of using the common lines of the preceding few rows connected in cascade to control the switching signals of the control circuit can avoid RC delay due to long signal lines and thus the incorrect signal transmission problem. In addition, the voltages on the common lines $V_{DD}$ and $-V_{SS}$ have a wider variation range than the previous embodiment, a larger input voltage variation range can be provided.

Embodiment 4

Figure 5B:
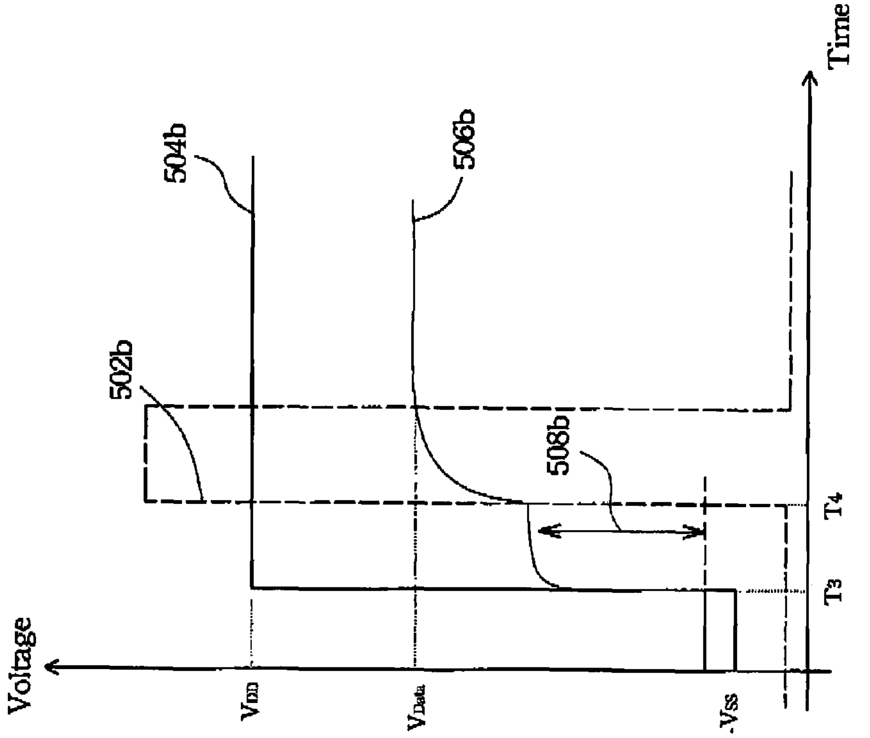
FIG. 5B shows the relation between voltage and time when the gate signal line is connected to the scan line of the liquid crystal pixels in the preceding row.
Figure 5A:
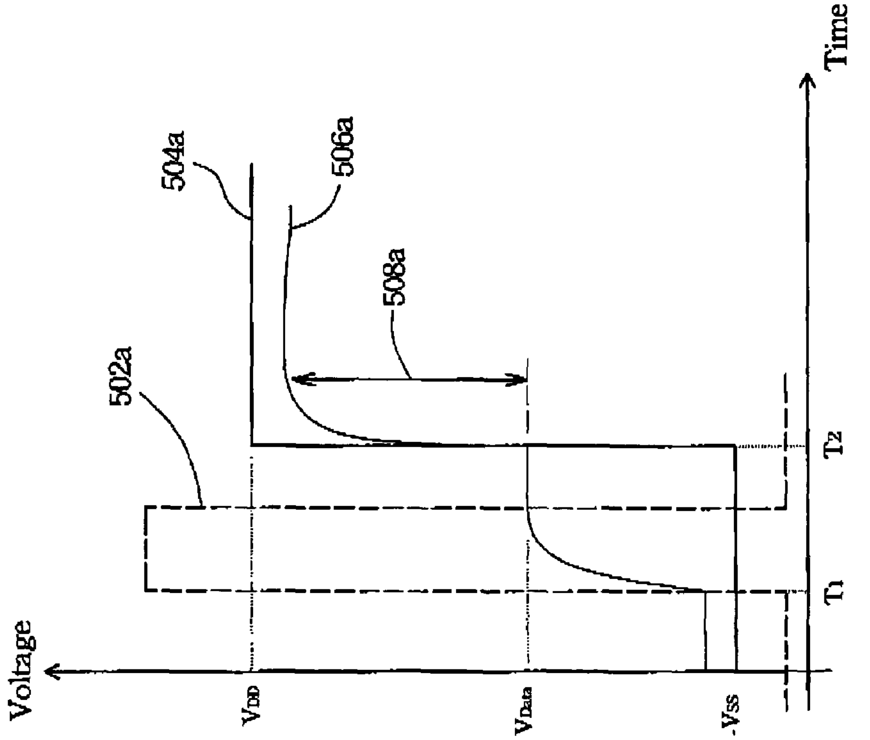
FIG. 5A shows the relation between voltage and time when the gate signal line is connected to the scan line of the liquid crystal pixels in the succeeding row.

Please refer to FIGS. 5A, 5B, and 2B for another embodiment of the invention. We discuss the gate signal line of the control circuit in this embodiment. As described before, the gate signal line 202 is connected to a scan line, using the pass pulse of the scan to control the ON and OFF of the transistors 212, 214. However, the scan line does not need to correspond to the common line connected to the control circuit. That is, the scan line and the common line do not need to belong to the same row. In the following, we explain the cases whether the gate signal line 202 is connected to the scan line of the preceding row or the succeeding row. The preceding row or the succeeding row maybe not adjacent to the row which the common line belongs.

As shown in FIG. 5A, the scan line of a liquid crystal pixel sends a pass pulse at time $T_1$. The voltage signal 502*a* on the scan line turns on so that the voltage signal 506*a* of the pixel electrode rises to a data voltage $V_{Data}$. Afterwards, the voltage signal 502*a* on the scan line shuts down. At this moment, the voltage signal 506*a* of the pixel electrode enters a floating status.

Since the gate signal line 202 is connected to the scan line of the liquid crystal pixels in the succeeding row, therefore the voltage signal 504*a* of the common line changes to $V_{DD}$. At this moment, the voltage signal 504*a* of the common line couples to the voltage signal 506*a* of the pixel electrode. The voltage signal 506*a* of the pixel electrode raises a potential difference 508*a*.

The above operation method explains the case where the gate signal line 202 connected to is the scan line of the succeeding row. However, due to the liquid crystal pixel design problem, the above-mentioned pixel electrodes are coupled to generate a potential difference 508*a* larger than the allowed range of the liquid crystal work voltage. In this situation, one has to connect the gate signal line 202 to the scan line of the liquid crystal pixels in the preceding row. Thus, the voltage signal on the common line of the liquid crystal pixels in the same row can be changed earlier than the voltage signal of the pixel electrode. This prevents the problem of a large potential difference 508*a* generated by coupling to the pixel electrode.

FIG. 5B shows the relation between voltage and time when the gate signal line 202 is connected to the scan line of the preceding row. Since the gate signal line 202 is connected to the scan line of the preceding row, the voltage signal 504*b* of the common line at time $T_3$ first changes to $V_{DD}$. The voltage signal 504*b* of the common line couples to the voltage signal 506*b* of the pixel electrode, so that the voltage signal 506*b* of the pixel electrode raises a potential difference 508*b*.

At time $T_4$, the scan line of the liquid crystal pixel sends a pass pulse and the voltage signal 502*b* of the pixel electrode turns on. The voltage signal 506*b* of the pixel electrode is written to a data voltage $V_{Data}$. Afterwards, the voltage signal 502*b* on the scan line shuts down. The voltage signal 504*b* of the common line is changed before the voltage signal 506*b* of the pixel electrode. This prevents the problem of too large a potential difference 508*b* due to the coupling to the voltage signal 506*b* of the pixel electrode.

The embodiments in FIGS. 5A and 5B show the example where the voltage signal (504*a* or 504*b*) of the common line varies from the $-V_{SS}$ to $V_{DD}$. The potential of the common line changes from low to high. If the potential of the common line changes from high to low (i.e., from $V_{DD}$ to $-V_{SS}$), the voltage versus time relations of the scan line, the pixel electrode, and the common line are similar to those in FIGS. 5A and 5B and are not further described herein.

It should be noted that whether the potential of the common line varies from high to low or from low to high, if the gate signal line 202 connects to the scan line of the preceding row, the voltage signal on the common line of the same row be changed before the voltage signal of the pixel electrode. This prevents the problem of too large a potential difference because of the coupling to the pixel electrode when the gate signal line 202 is connected to the scan line of the succeeding row.

However, one has to be careful about several problems when using this method. First, the transistor and the control circuit have the RC delay problem. Therefore, if the time difference between $T_3$ and $T_4$ is not long enough, the voltage signal 504*b* of the common line cannot reach the predetermined $V_{DD}$ before the voltage signal 502*b* on the scan line turns on. Then the incorrect data writing will occur. This is related to the voltage imposed on the liquid crystal molecule and potential difference between the pixel electrode and the common line. When the voltage of the common line is not ready yet, the potential difference in between will have an error.

Therefore, the switching time $T_3$ of the voltage signal 504*b* on the common line and the switching time $T_4$ of the voltage signal 502*b* on the scan line have to be far apart enough in order for the voltage on the common line to make the necessary switch completely. That is, the scan line connected to the control circuit has to be the one of the more preceding rows. The invention uses this property to provide a sufficient time interval.

Nonetheless, one should notice another thing when uses this operation method. For example, if the gate signal line of the control circuit is connected to the scan line of the preceding third row (n−3) and the liquid crystal pixel in the current row is controlled by the n-th row of scan line, the liquid crystal pixels in the first and second rows of the panel do not have the scan lines in the preceding (−2)-th and (−1)-th rows for connection to the gate signal line, one has to use a gate drive IC to provide corresponding dummy scan lines. Corresponding scan lines have to be provided on the glass substrate too. Thus, the design is more complicated.

Embodiment 5

In yet another embodiment of the invention, we provide a double gate pulse operation method to control the scan line and common line of a liquid crystal pixel. First, a switching voltage write pulse makes the control circuit write a predetermined common level to the common line. After the other end of the common line (i.e. the whole common line) reaches the same predetermined common level, another pixel voltage write pulse is used to write pixel data to the liquid crystal pixel. In the following, we refer to the control circuit 200*a* and the common line 402 in FIG. 4 and FIGS. 6A and 6B to explain the disclosed double gate pulse operation method.

Figure 6A:
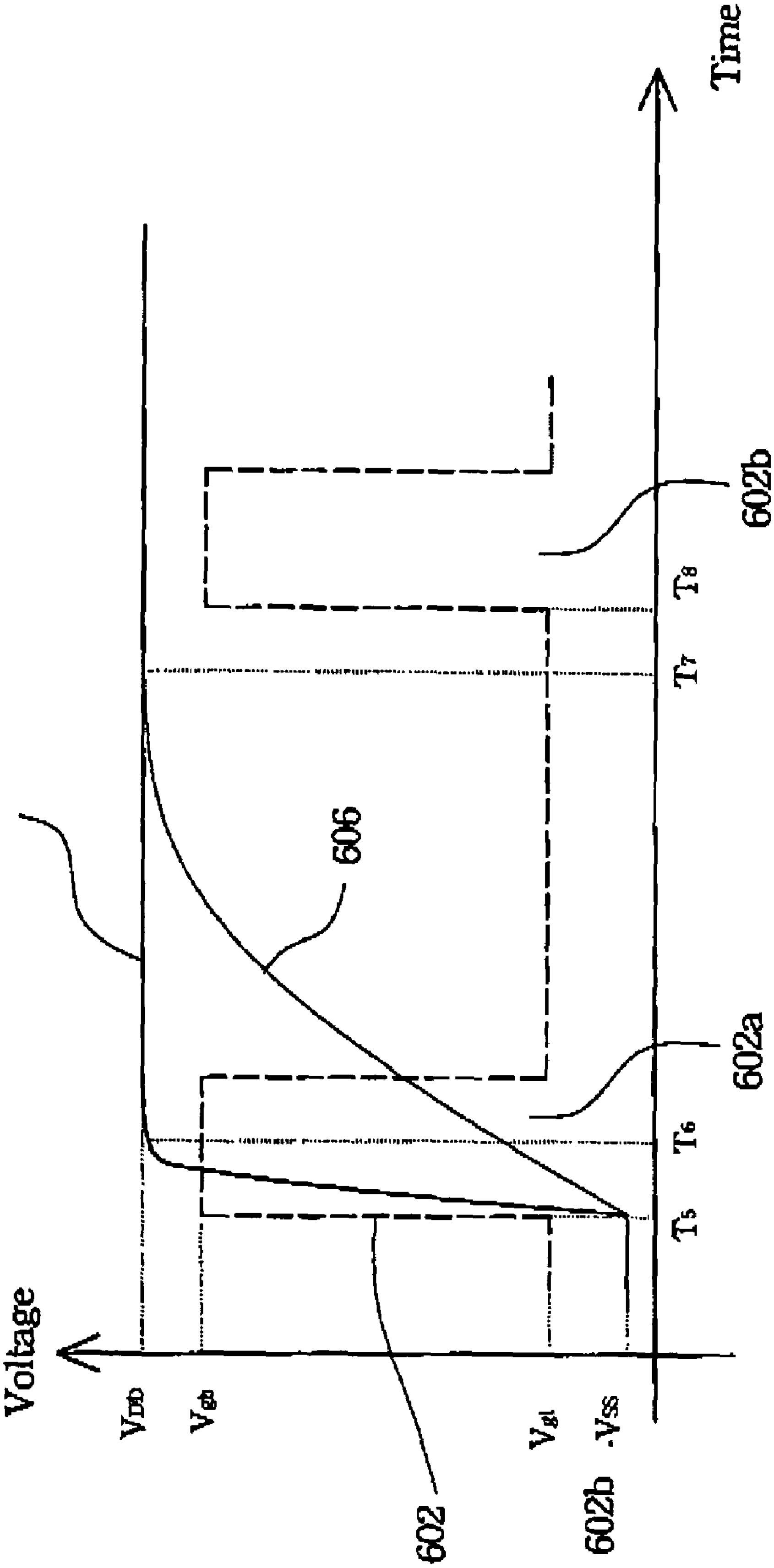
FIG. 6A shows a preferred embodiment of the disclosed double gate pulse operation method.

As shown in FIG. 6A, at time $T_5$ the voltage signal 602 on the scan line sends a switching voltage write pulse 602*a* to the control circuit 200*a*, which then writes a predetermined common level $V_{DD}$ to the common line 402. At the moment, the node 204*a* between the common line 402 and the control circuit 200*a* has a voltage signal 604 reaching the predetermined common level $V_{DD}$ at time $T_6$.

However, the voltage signal 606 of the terminal end of the common line 402 (the terminal 412 that is not connected to the control circuit 200*a*) has not reached the predetermined common level $V_{DD}$ at time $T_6$. The disclosed double gate pulse operation method waits until the voltage signal 606 of the terminal 412 also reaches the predetermined common level $V_{DD}$ (time $T_7$). Afterwards, the voltage signal 602 on the scan line sends another pixel voltage write pulse 602*b* at time $T_8$ for the liquid crystal pixel to be written with pixel data.

Figure 6B:
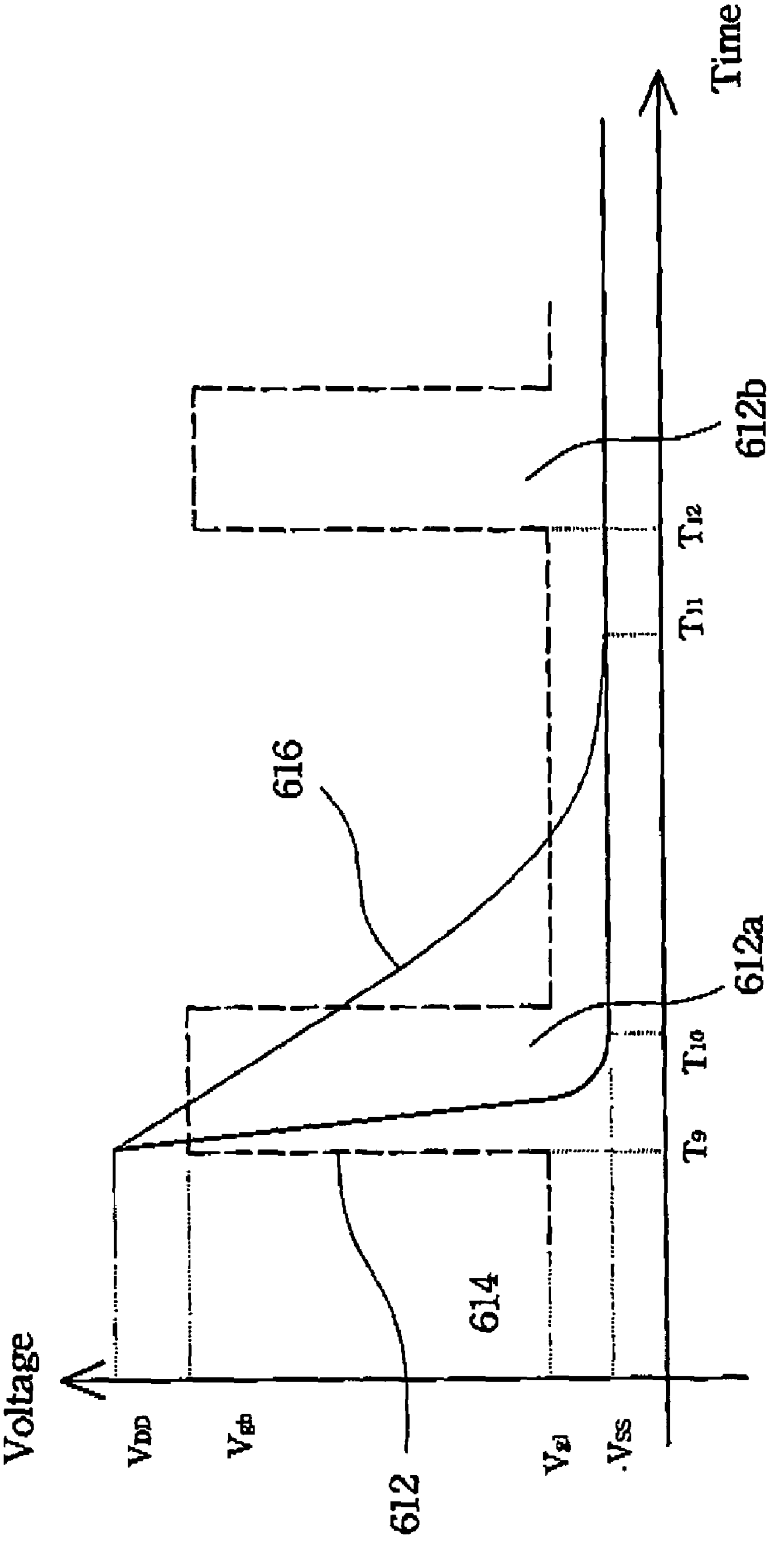
FIG. 6B shows another embodiment of the disclosed double gate pulse operation method.

FIG. 6B shows another embodiment of the disclosed double gate pulse operation method. As shown in the drawing, the voltage signal 612 on the scan line sends a switching voltage write pulse 612*a* to the control circuit 200*a* at time $T_9$, so that the control circuit 200*a* writes a predetermined common level $-V_{SS}$ on the common line 402. At this moment, the voltage signal 614 at the node 204*a* of the common line 402 and the control circuit 200*a* in FIG. 4 reaches the predetermined common level $-V_{SS}$ at time $T_{10}$.

However, the voltage signal 616 of the terminal end of the common line 402 (the terminal 412 that is not connected to the control circuit 200*a*) has not reached the predetermined common level $-V_{SS}$ at time $T_{10}$. The disclosed double gate pulse operation method waits until the voltage signal 616 of the terminal 412 also reaches the predetermined common level $-V_{SS}$ (time $T_{11}$). Afterwards, the voltage signal 612 on the scan line sends another pixel voltage write pulse 612*b* at time $T_{12}$ for the liquid crystal pixel to be written with pixel data.

The most important thing in these two embodiments is that the time $T_8$ or $T_{12}$ (the starting time of the pixel voltage write pulse) has to be later than the time $T_7$ or $T_{11}$ (the time the whole common line 402 reaches the predetermined common level). This ensures that the voltage of the common line has completed switching each time the liquid crystal pixel is written with pixel data. This prevents errors on the potential difference because the voltage on the common line is not ready.

From the description of the above-mentioned embodiments, we see that the invention has the following advantages:

1. The voltages on the common lines for different rows are independently switched by the disclosed control circuit. Therefore, the voltage of each common line only switches once in each frame time, preventing the power consumption problem due to high switching frequencies.

2. The common lines of the disclosed LCD do not need to be connected together. This can avoid the horizontal cross-talk problem caused by the high impedance as a result of the common lines being connected together in the prior art.

3. Using the disclosed double gate pulse operation method, it can be guaranteed that the voltage on the common line has done the switching before a liquid crystal pixel is written with pixel data. Consequently, the invention can solve the problem of perturbations in the potential difference on the liquid crystal because of the asynchronous switching between the double scan lines and the common line.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A control circuit for a common line for controlling the voltage of the common line, the control circuit comprising:
- a first input element for receiving a first switching signal;
- a second input element for receiving a second switching signal;
- an output element for receiving the first and second switching signals from the first and second elements, and to provide the voltage of the common line according to the first and second switching signals; and
- a controlling input arranged to control the first and second input elements to send the first and second switching signals to the output element.

2. A control circuit for a common line as in claim 1, wherein the output element comprises:
- a first reference element connected to a first voltage, and are arranged to receive the first switching voltage; and
- a second reference element connected to a second voltage, and are arranged to receive the second switching voltage;
- wherein the voltage of the common line is determined by the first and second voltages.

3. A control circuit for a common line as in claim 2, wherein further comprises:

a first capacitor is connected to the first input element to store the first switching signal and the ON and OFF of the first reference element is controlled by the first switching signal stored in the first capacitor; and a second capacitor is connected to the source of the second input element to store the second switching signal and the ON and OFF of the second reference element is controlled by the second switching signal stored in the second capacitor.

4. A control circuit for a common line as in claim 2, wherein the first reference element and the second reference element are transistors.

5. A control circuit for a common line as in claim 1, wherein the first input element and the second input element are transistors.

6. A control circuit for a common line as in claim 1, wherein the controlling input is connected to a scan line.

7. A control circuit for a common line as in claim 6, wherein the scan line and the common line belong to two different rows.

8. A control circuit for a common line as in claim 6, wherein the scan line and the common line belong to the same rows.

9. A control circuit for a common line as in claim 1, wherein the first and second switching signals are with the same frame time.

10. A control circuit for a common line as in claim 9, wherein the first switching signal and the second switching signal have opposite logic levels.

11. A control circuit for a common line as in claim 1, wherein the first switching signal is received from a preceding first common line, and the second switching signal is received from a preceding second common line.

12. A liquid crystal display (LCD) with a plurality of common lines and pixels characterized in that:

each of the common lines are connected to one of a plurality of control circuits for common lines in a one-to-one correspondence relation, and each of the control circuits controls the voltage of the associated common line, wherein each of the control circuits comprises:

a first input element arranged to receive a first switching signal;

a second input element arranged to receive a second switching signal; an output element arranged to receive the first and second switching signals from the first and second elements, and to change the voltage of the common line according to the first and second switching signals; and each of the controlling input of the control circuits is connected to one of a plurality of scan lines, and arranged to control the first and second input elements to send the first and second switching signals to the output element;

wherein the scan line and the common line belong to two different rows of the liquid crystal pixel.

13. A method for controlling a common line connected to the control circuit, the control circuit having a first input element, a second input element, an output element, a controlling input; wherein the method comprises the steps of:

receiving a first switching signal by the first input element and a second switching signal by the second input element;

entering a signal to the controlling input to control the first and second input elements to send the first and second switching signals to the output element; and providing the voltage of the common line by the output element according to the first and second switching signals from the first and second elements.

14. The method of claim 13, wherein the voltage of the common line becomes the same as a first voltage when the first switching signal has a high logic level and the voltage of the common becomes the same as a second voltage when the second switching signal has a high logic level.

15. The method of claim 14, wherein when the voltages of adjacent two of the common lines are the same, the two first switching signals of the two common lines have the same logic level and the two second switching signals of the two common lines have the same logic level.

16. The method of claim 14, wherein when adjacent two of the common lines have different voltages, the two first switching signals of the two common lines have opposite logic level and the two second switching signals of the two common lines have opposite logic level.

17. A control circuit for a common line as in claim 13, wherein the first and second switching signals are with the same frame time.

18. A control circuit for a common line as in claim 17, wherein the first switching signal and the second switching signal have opposite logic levels.

19. The method of claim 13, wherein the signal is a pass pulse by a scan line.

20. The method of claim 19, wherein the scan line and the common line belong to the same row.

21. The method of claim 19, wherein the scan line and the common line belong to two different rows.

22. The method of claim 13, wherein the method further comprises:

receiving the first switching signal from a preceding first common line; and receiving the second switching signal from a preceding second common line.

23. A method for controlling the voltage of a liquid crystal pixel, comprising the steps of:

providing a first switching signal to control the voltage signal of a scan line of the liquid crystal pixel;

providing a second switching signal to control the voltage signal of a common line of the liquid crystal pixel;

wherein the voltage of the liquid crystal pixel is changed to a first level as the first switching signal is enable, and the voltage of the liquid crystal pixel is changed to a second level as the second switching signal is enable.

24. The method of claim 23, wherein the second switching signal is provided by a scan line of another row different from a row of the liquid crystal pixel.

25. The method of claim 24, wherein the scan line is elected according to the voltage of the liquid crystal pixel.

26. A control method of a liquid crystal pixel for controlling a scan line of the liquid crystal pixel and a common line, the control method comprising the steps of:

providing a first switching signal to raise the voltage of the common line to a predetermined common level; and providing a second switching signal to the scan line after the terminal end of the common line reaches the predetermined common level so that the liquid crystal pixel starts to be written with pixel data.

* * * * *